United States Patent [19]

Phadke

[11] Patent Number: 4,757,112
[45] Date of Patent: Jul. 12, 1988

[54] SINGLE STEP BULK PROCESS FOR HIGH IMPACT POLYAMIDE MASTERBATCHES, PRODUCTS THEREOF AND BLENDS WITH POLYAMIDES

[75] Inventor: Shrikant V. Phadke, Baton Rouge, La.

[73] Assignee: Copolymer Rubber & Chemical Corp., Baton Rouge, La.

[21] Appl. No.: 86,202

[22] Filed: Aug. 17, 1987

Related U.S. Application Data

[63] Continuation of Ser. No. 800,332, Nov. 21, 1985, abandoned.

[51] Int. Cl.$^4$ .............................................. C08L 77/00
[52] U.S. Cl. ..................................... 525/66; 525/181; 525/183
[58] Field of Search .......................... 525/66, 181, 183

[56] References Cited

FOREIGN PATENT DOCUMENTS 58-206667 12/1983 Japan .................................... 525/181
60-49018 3/1985 Japan .................................... 525/181

Primary Examiner—John C. Bleutge
Assistant Examiner—A. Carrillo
Attorney, Agent, or Firm—Jones, Day, Reavis & Pogue

[57] ABSTRACT

This invention is an improvement over the copending Olivier application Ser. No. 537,789, now U.S. Pat. No. 4,594,386, filed Sept. 30, 1983 and entitled "Polyamide Grafted EPM Blend". This invention relates to the further improvement in impact strength and toughness of polycaprolactams and other polyamide based resinous compositions and to a new and improved method for the manufacture of same.

19 Claims, No Drawings

SINGLE STEP BULK PROCESS FOR HIGH IMPACT POLYAMIDE MASTERBATCHES, PRODUCTS THEREOF AND BLENDS WITH POLYAMIDES

This application is a continuation, of application Ser. No. 800,332, filed 11/21/85, now abandoned.

BACKGROUND OF THE INVENTION

Improvement of impact strength and toughness of polyamide resins has been made the subject matter of research and development over a considerable period of time. The tendency of articles molded of polyamide resins to crack or break upon impact, in a brittle fashion, imposes a serious limitation on the ability to make use of such molded articles, especially at low temperatures.

The endeavors to improve impact strength and toughness have led to the blending of the polyamides, with a variety of additives including rubbers and other modified and unmodified resins with various degrees of success. One such recent endeavor is described in the Epstein U.S. Pat. No. 4,174,358, issued Nov. 13, 1979, wherein polyamide resins are blended with random copolymers selected to adhere to the polyamide resin.

The aforementioned copending application seeks to overcome some of the deficiencies of the cited Epstein patent by blending the polyamide resin with a low molecular weight, saturated ethylene-mono-olefin copolymer rubber, and preferably an ethylene-propylene copolymer rubber (EPM) which has been grafted to provide labile cross-links with an unsaturated polycarboxylic acid or anhydride and preferably maleic anhydride. The described reversibly cross-linked EPM copolymer rubber acquires the characteristic of a higher molecular weight solid material that enables easy handling and shipment in a solid state, and disruption of cross-links when blended at high temperature with the polyamide base resin at the station of use whereby the EPM components reverts to low molecular weight when in the blend thereby to enhance its utility as a toughening agent and impact improver of the matrix polyamide resin composition.

SUMMARY OF THE INVENTION

It has been found that still further improvements in impact strength and toughness of polyamide based resinous compositions can be achieved and their process of manufacture can be greatly simplified by combining the ingredients for reaction in a bulk state in combination with and in the presence of a part of the polycaprolactam or polyamide resin for reaction therewith to form a masterbatch which can thereafter be blended in a bulk state with the remainder of the polyamide resinous component to form the final composition.

By carrying out the reaction in a bulk dry solid state in the presence of a portion of the polyamide resin, it is no longer necessary to limit the rubber component to a low molecular weight EPM, as described in the aforementioned copending application. It is also apparent that this invention provides the advantage of eliminating the steps of separately preparing the cross linked EPM polymer rubber for subsequent blending with the polyamide resin.

It has been found further that the masterbatch prepared in accordance with the practice of this invention is more easily and more effectively blended with the remainder of the polyamide resin to produce a more uniformly blended product having improved impact strength and toughness by comparison with a blend of the same composition prepared in accordance with the teachings of the aforementioned copending application.

As the EPM rubber, use can be made of an ethylenemono-olefin and preferably an ethylene-propylene copolymer rubber formed by copolymerization in solvent solution, in the presence of a Ziegler-type catalyst, of ethylene and one or more mono-olefins, preferably propylene, but which may include 1-butene, 1-pentene, or other mono-olefins having 3–12 carbon atoms. The ratio of ethylene to propylene or $C_3$–$C_{12}$ mono-olefin may range from 10–95 moles of ethylene to 90–5 moles of propylene or other mono-olefins. The preferred range of ethylene to propylene or other mono-olefin is 45–75 moles of ethylene to 55–25 moles of propylene or other mono-olefin.

The solvent medium in which the copolymerization reaction is carried out may be any suitable inert organic solvent that is liquid under reaction conditions and it may be a prior art solvent for solution polymerization of mono-olefin in the presence of a Ziegler-type catalyst. Examples of satisfactory hydrocarbon solvents include straight chain paraffins having from 5–8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5–6 carbon atoms in the ring nucleus. The solvent selected may be a mixure of one or more of the foregoing hydrocarbons and preferably a mixture of aliphatic and napthenic hydrocarbons having approximately the same boiling range as normal hexane. It is desirable that the solvent be dry and free of substances that will interfere with the Ziegler-type catalyst used in the polymerization reaction.

Ziegler catalysts of the type well known to the prior art may be used. Such Ziegler-type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff period system of elements, such as titanium, vanadium and chromium halides with an organo-metallic compound of a metal of groups I, II or III of the Mendeleeff period system which contains at least one carbon-metal bond, such as trialkyl aluminum, and alkyl aluminum halides in which the alkyl groups contain from 1–20 and preferably 1–4 carbon atoms.

The preferred Ziegler catalyst for interpolymerization is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mol ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organometallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride per 5-300 moles of aluminum and more preferably 15-60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator. When expressed on the basis of RSV, withdrawal is carried out when the desired molecular weight has been reached, such as a polymer having an RSV within the range of 0.4-5.0 and preferably 1.5-3.0. RSV is the reduced solution viscosity of a 0.1 percent solution in decalin at 135° C.

As the component reacted onto the EPM rubbery copolymer, it is preferred to make use of maleic anhydride but other unsaturated dicarboxylic acid anhydrides or acids may be used having the general formula

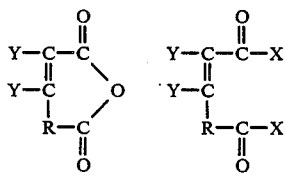

in which R is an alkylene group having from 0-4 carbon atoms and Y is preferably hydrogen but may be an organic group such as a branched or straight chain alkyl group, an anhydride, ketone, heterocyclic or other organic group of 1-12 carbon atoms, a halogen group such as chlorine, bromine, or iodine and in which at least one, and preferably both of the X groups are hydroxyl but in which one of the X groups may be an ester forming group such as an alkoxy or aryloxy group having from 1-8 carbon atoms.

For example, the maleic anhydride in the following examples may be substituted in whole or in part with equal molecular equivalents of other unsaturated dicarboxylic acids or anhydrides, such as itaconic acid or anhydride, fumaric acid or anhydrides, maleic acid and the like.

The reaction is carried out in the presence of a peroxide catalyst such as dicumyl peroxide, t-butyl hydroperoxide, benzoyl peroxide, t-butylperoctanoate, di-t-butylperoxide, t-butylhydroperoxide, cumene hydroperoxide, t-butylperbenzoate, 2,5-dimethyl-2,5-di(t-butylperoxy) hexane, or other free radical source capable of hydrogen abstraction, as represented by alkyl peroxy esters, alkyl peroxides, alkyl hydroperoxides, diacylperoxides and the like, which is added with the EPM, reactive agent and polyamide, in bulk, to the reaction chamber.

The desired results are achieved when the amount of anhydride or diacid reacted, at least in part, by way of a grafting reaction onto the EPM polymer is within the range of 0.2-5 percent by weight of the base polymer and preferably in an amount within the range of 0.5-4 percent by weight. In general, the amount reacted onto the polymer will represent only about 30-80 percent of the material introduced into the reaction.

As used herein, the term "Polyamide resin" includes all polymers having recurring carbonamide groups in the main chain, and having molecular weights greater than 2000. "Molecular weight", as used herein, refers to number average molecular weight for polyamides (see Flory "Principals of Polymer Chemistry", page 273, published 1953 by Cornell University Press).

The polyamide resin is ordinarily produced by condensation of equimolar amount of dicarboxylic acid or acid derivative containing from two to twenty carbon atoms with a diamine, containing from two to fifteen carbon atoms, or by lactam polymerization according to well known techniques. Preferred polyamides are those based on lactams and those based on aliphatic diamines condensed with aliphatic or aromatic diacids. Included in this group are polyhexamethylene adipamide (nylon 6,6), polycaprolactam (nylon 6), poly(undecaneamide) (Nylon 11), polyhexamethylene sebacamide (nylon 6,10), polyhexamethylene isophthalamide, polyhexamethylene tereco-isophthalamide, and mixtures or copolymers thereof.

Similar polyamides have been marketed by Allied Corporation under the trade name Capron 8202C and under the designations LSM and BAT and by Firestone Rubber Company under the designation 228-001 (low viscosity) and with the suffix HS, which means heat stablized.

In accordance with the practice of this invention, the reaction is carried out in the presence of a portion of the polyamide resin making up the final product. The desired improvements in impact strength and toughness can be obtained when the reaction is carried out in combination with 10-80 percent and preferably within the range of 20-50 percent by weight of the amount of polyamide resinous component of the final product. This intermediate reaction product, which contains some of the polyamide resin, is referred to herein as a masterbatch with which the remainder of the polyamide resin can be blended. Optimum results are secured when the rubbery polymer to polyamide resin in the masterbatch are present in the ratio of 15-80 parts by weight rubbery polymer to 85-20 parts by weight polyamide and preferably 20-60 parts by weight rubbery polymer (EPDM) to 80-40 parts by weight polyamide resin.

The masterbatch that is formed appears to have improved compatability with the polyamide resin subsequently blended therewith to provide a more uniform product characterized by improved strength and toughness. The initial reaction to form the masterbatch can be carried out in a solvent solution, but it is preferred, from the standpoint of simplicity, cost and equipment to carry out the reaction by a mastication process or in melt processing equipment wherein the various components are worked together in their solid states, such as in a banbury, Brabender plasticorder, extruder and the like at elevated temperatures such as at a temperature within the range of 350°–550° F. and preferably 400°–500° F. Blending of the masterbatch with the remainder of the polyamide resin can be carried out under similar conditions while the ingredients are in the form of a hot melt or plastic state.

The invention will now be described by way of the following examples.

EXAMPLE 1

A composition consisting of 80 parts by weight of an ethylene-propylene copolymer having an RSV of 2.75 and in which the ethylene and propylene are bound in the molar ratio of 60/40 (EPsyn ® 7006 marketed by Copolymer Rubber & Chemical Corporation), 13.87 parts by weight of Nylon 6, marketed by Allied Corporation under the designation LSM, 6.13 parts by weight of Nylon 6, marketed by Allied Corporation under the designation BAT, and 1.69 parts by weight of a solution containing 10 parts by weight of maleic anhydride in 6.6 parts by weight of acetone and 1.0 part by weight of 2,5-dimethyl-2,5-di(t-butylperoxy) hexane (DBPH) was extruded three times through a 1", 20/1 L/D single-screw (Killion) extruder at the temperatures of 425° F. in the barrel and 400° F. in the die. The extruded strands were air-cooled and chopped into pellets. Percent gel value of the pellets was determined. Percent gel is the percentage of the sample not dissolved after shaking in tetrahydrofuran (THF) for 4 hours at room temperature. The test used 1 gram of pellets in 100 grams of THF.

EXAMPLE 2

A composition containing 1 part by weight of the pellets prepared in Example 1, 2.0625 parts by weight of LSM Nylon 6, and 0.6875 part by weight of BAT Nylon 6 was extruded three times through a 1", 20/1 L/D single-screw (Killion) extruder at the temperatures of 450° F. in the barrel and 425° F. in the die. The extruded strands were air-cooled and chopped into pellets. The pellets were molded into test specimens for notched Izod impact strength, tensile strength, and elongation using a plunger injection molder with a cavity temperature of 500°–520° F. and a mold temperature of 175° F. The molded test specimens were stored in a moisture-proof polyethylene bag for at least 16 hours prior to testing. The testing was carried out according to the methods listed below:

Notched Izod impact strength—ASTM D256A
Tensile strength and elongation—ASTM D638

The melt flow on the pellets was measured according to ASTM D1238, Condition L. Percent gel value of the pellets was determined according to the procedure described in Example 1.

EXAMPLE 3

Same as Example 1, except the composition by weight was as follows: 50 parts of EPsyn 7006, 37.5 parts of LSM Nylon 6, 12.5 parts of BAT Nylon 6, and 1.056 parts of a solution containing 10 parts by weight of maleic anhydride in 6.6 parts of acetone and 1.0 part by weight of DBPH.

EXAMPLE 4

A composition containing one part by weight of the pellets prepared in Example 3, 1.125 parts by weight of LSM Nylon 6, and 0.375 part by weight of BAT Nylon 6 was extruded, pelletized and molded and the molded samples were stored and tested in a manner identical to that described in Example 2.

EXAMPLE 5

A composition containing 20 parts by weight of EPsyn 7006, 0.4225 part by weight of a solution containing 10 parts by weight of maleic anhydride in 6.6 parts by weight of acetone and 1.0 part by weight of DBPH, 60 parts by weight of LSM Nylon 6, and 20 parts by weight of BAT Nylon 6 was extruded three times through a 1" 20/1 L/D single-screw (Killion) extruder at the temperatures of 425° F. in the barrel and 400° F. in the die. The extruded strands were air-cooled and chopped into pellets. The pellets were molded into test specimens and the test specimens were stored and tested in a manner identical to that described in Example 2.

EXAMPLE 6

Same as Example 1, except 20 parts by weight of LSM Nylon 6 was used instead of 13.87 parts by weight of LSM Nylon 6 and 6.13 parts by weight of BAT Nylon 6 and the composition was subjected to two extrusions instead of three extrusions.

EXAMPLE 7

Same as Example 2, except the pellets prepared in Example 6 were used instead of the pellets prepared in Example 1, and the composition was subjected to two extrusions instead of three extrusions.

EXAMPLE 8

Same as Example 6, except 15 parts by weight of LSM Nylon 6 and 5 parts by weight of BAT Nylon 6 was used instead of 20 parts by weight of LSM Nylon 6.

EXAMPLE 9

Same as Example 7, except the pellets prepared in Example 8 were used instead of the pellets prepared in Example 6.

EXAMPLE 10

Same as Example 8, except the solution containing maleic anhydride, acetone and DBPH was not used.

EXAMPLE 11

Same as Example 7, except the pellets prepared in Example 10 were substituted for the pellets prepared in Example 6.

EXAMPLE 12

Same as Example 8, except 0.4318 part by weight of a solution containing 0.375 part by weight of acetone and 0.0568 part by weight of DBPH was used instead of 1.69 parts by weight of the solution containing maleic anhydride, acetone and DBPH.

EXAMPLE 13

Same as Example 11, except the pellets prepared in Example 12 were substituted for the pellets prepared in Example 10.

The test results of the above examples are shown in Table I. In this table, the designation "masterbatch" is used to describe the compositions containing percentages of polyamide which are less than those in the final blends.

It will be seen from the test results shown in Table I that:

(a) This invention provides the advantage of eliminating the steps of separately preparing the cross-linked EPM polymer rubber for subsequent blending with the polyamide resin as described in the aforementioned copending application.

(b) Chemical attachments occur between the reacted rubber and polyamide. These attachments do not occur between unreacted (ungrafted) rubber and polyamide. Examples 10 and 11 illustrate compositions containing unreacted rubber.

TABLE I

Properties of Crafted Masterbatches and Corresponding Nylon 6 Blends

| MASTERBATCHES | | | | | | | |
|---|---|---|---|---|---|---|---|
| Example # | 1 | 3 | — | 6 | 8 | 10 | 12 |
| Parts EPsyn ® 7006 | 80 | 50 | — | 80 | 80 | 80 | 80 |
| Parts LSM Nylon 6 | 13.87 | 37.5 | — | 20 | 15 | 15 | 15 |
| Parts BAT Nylon 6 | 6.13 | 12.5 | — | — | 5 | 5 | 5 |
| phr Maleic Anhydride | 1.2 | 1.2 | — | 1.2 | 1.2 | — | 1.2 |
| phr DBPH | 0.12 | 0.12 | — | 0.12 | 0.12 | — | — |
| % Gel | — | — | — | 71 | 71.8 | 7.8 | 10.2 |
| FINAL BLENDS | | | | | | | |
| Example # | 2 | 4 | 5 | 7 | 9 | 11 | 13 |
| Parts EPsyn 7006 | — | — | 20 | — | — | — | — |
| Parts Masterbatch | 1 | 1 | — | 25 | 25 | 25 | 25 |
| Parts LSM Nylon 6 | 2.0625 | 1.125 | 60 | 56.25 | 56.25 | 56.25 | 56.25 |
| Parts BAT Nylon 6 | 0.6875 | 0.375 | 20 | 18.75 | 18.75 | 18.75 | 18.75 |
| phr Maleic Anhydride | — | — | 1.2 | — | — | — | — |
| phr DBPH | — | — | 0.12 | — | — | — | — |
| % Gel | — | — | 99.6 | 99.6 | 100 | 96.1 | 95.2 |
| Melt Flow, gms/10 mins | — | — | 2.1 | 0.5 | 2.1 | 9.9 | 9.0 |
| 25° C. NI, ft-lbs/inch | 18.0 | 18.1 | 17.5 | 18.5 | 17.8 | 1.0 | 1.1 |
| −20° C. NI, ft-lbs/inch | 18.1 | 17.4 | 14.8 | 16.9 | 11.2 | 0.8 | 0.8 |
| Tensile Strength, psi | 5770 | 5850 | 5387 | 4976 | 5088 | 5040 | 4970 |
| Elongation, % | 190 | 125 | 230 | 240 | 140 | 75 | 70 |

NOTES:
phr: parts per 100 parts of rubber.
NI: notched Izod impact strength
% gel in EPsyn 7006: 1.7%
% gel in Nylon 6: 100%

I claim:

1. The method of producing a polyamide based composition having improved toughness and impact strength comprising first forming a masterbatch by thermally reacting 10–80 percent by weight of the total amount of the polyamide resin in the polyamide based composition with an ethylene-mono olefin copolymer rubber and a reaction material in the form of an anhydride having the general formula

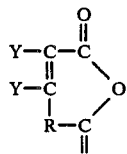

or corresponding unsaturated dicarboxylic acid or derivative thereof having the general formula

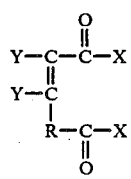

in which R is an alkylene group having from 0–4 carbon atoms, Y is selected from the group consisting of hydrogen, halogen or an organic group having from 1–12 carbon atoms and X is a hydroxyl or ester forming group but in which at least one X is hydroxyl, and then blending the masterbatch with the remainder of the polyamide increment.

2. The method as claimed in claim 1, in which the polyamide resin is a polycaprolactam.

3. The method as claimed in claim 2, in which the ethylene-mono olefin copolymer is an ethylene-propylene rubber.

4. The method as claimed in claim 3, in which the ethylene and propylene are present in the bound state in the ratio of 10–95 moles ethylene to 90–5 moles propylene.

5. The method as claimed in claim 2, in which the reaction material is maleic anhydride or mono-ester thereof.

6. The method as claimed in claim 2, in which the reaction material is present in an amount within the range of 0.2–5.0 percent by weight of the copolymer rubber component.

7. The method as claimed in claim 2, in which the reaction material is present in an amount within the range of 0.5–4.0 percent by weight of the copolymer rubber component.

8. The method as claimed in claim 2, in which the polycaprolactam in the masterbatch comprises 20–50 percent by weight of the polycaprolactam in the final blend composition.

9. The method as claimed in claim 1, in which the polyamide is introduced into the reaction to form the masterbatch in the ratio of 15–80 parts by weight of the copolymer rubber to 85–20 parts by weight of the polyamide.

10. The method as claimed in claim 1, in which the polyamide and copolymer rubber are present in the masterbatch in the ratio of 40–80 parts by weight of the copolymer rubber to 60–20 parts by weight of the polyamide.

11. The method as claimed in claim 1, in which the materials are reacted to form the masterbatch in the presence of a peroxide catalyst.

12. The method as claimed in claim 1, in which the masterbatch is formed by reaction of the components in melt processing equipment.

13. The method as claimed in claim 12, in which the masterbatch components are reacted during processing in a melt processing equipment selected from the group consisting of an extruder, a Brabender plasticorder, and a Banbury.

14. The method as claimed in claim 12, in which the reaction to form the masterbatch is carried out at a temperature within the range of 350°–550° F.

15. The method as claimed in claim 12, in whioh the reaction to form the masterbatch is carried out at a temperature within the range of 400°–500° F.

16. The method as claimed in claim 1, in which the masterbatch material and the remaining polyamide are blended by working in a melt processing equipment.

17. A polyamide based composition having improved toughness and impact strength prepared by the method of claim 1.

18. A polycaprolactam based composition having improved toughness and impact strength prepared by the method of claim 2.

19. A polycaprolactam based composition prepared by the method of claim 11.

* * * * *